(12) United States Patent
Starkovich et al.

(10) Patent No.: US 10,923,716 B1
(45) Date of Patent: Feb. 16, 2021

(54) GRAPHENE-CARBON NANOTUBE HYBRID ELECTRODE MATERIAL

(71) Applicant: Northrop Grumman Systems Corporation, Falls Church, VA (US)

(72) Inventors: John A. Starkovich, Redondo Beach, CA (US); Hsiao-Hu Peng, Rancho Palo Verdes, CA (US); Edward M. Silverman, Encino, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 16/811,248

(22) Filed: Mar. 6, 2020

Related U.S. Application Data

(62) Division of application No. 15/593,623, filed on May 12, 2017, now Pat. No. 10,637,046.

(51) Int. Cl.
*H01M 4/36* (2006.01)
*H01M 4/04* (2006.01)
*H01M 10/0525* (2010.01)
*H01M 4/587* (2010.01)
*H01M 4/66* (2006.01)

(52) U.S. Cl.
CPC ......... *H01M 4/366* (2013.01); *H01M 4/0404* (2013.01); *H01M 4/587* (2013.01); *H01M 4/663* (2013.01); *H01M 10/0525* (2013.01)

(58) Field of Classification Search
CPC .... H01M 4/04; H01M 4/0404; H01M 4/0416; H01M 4/043; H01M 4/0452; H01M 4/045; H01M 4/0457; H01M 4/0478; H01M 4/587; H01M 4/663; H01M 4/366; H01M 10/0525; H01M 4/36; H01M 4/583
See application file for complete search history.

(56) References Cited

U.S. PATENT DOCUMENTS

| | | | |
|---|---|---|---|
| 2012/0052387 A1* | 3/2012 | Sung | H01M 4/366 429/218.1 |
| 2012/0064409 A1* | 3/2012 | Zhamu | H01M 4/131 429/221 |
| 2012/0100203 A1* | 4/2012 | Fang | A61L 17/04 424/443 |
| 2017/0221645 A1* | 8/2017 | Gangopadhyay | H01M 4/587 |
| 2018/0131229 A1* | 5/2018 | Valin | H02J 1/10 |
| 2019/0006675 A1* | 1/2019 | Cheng | H01G 11/22 |
| 2019/0067700 A1* | 2/2019 | Wu | H01B 1/04 |

\* cited by examiner

*Primary Examiner* — Stephen J Yanchuk
(74) *Attorney, Agent, or Firm* — McCracken & Gillen LLC

(57) ABSTRACT

A hybrid electrode and an energy storage device are disclosed. The hybrid electrode is applicable to use in advanced rechargeable energy storage and power sources. A non-woven sheet of carbon-nanotubes (CNTs) and a layer of lithiated graphene nanoparticles deposited on the sheet of CNTs are provided.

20 Claims, 5 Drawing Sheets

Filtered    Evaporated

Commercial Graphene Oxide Film

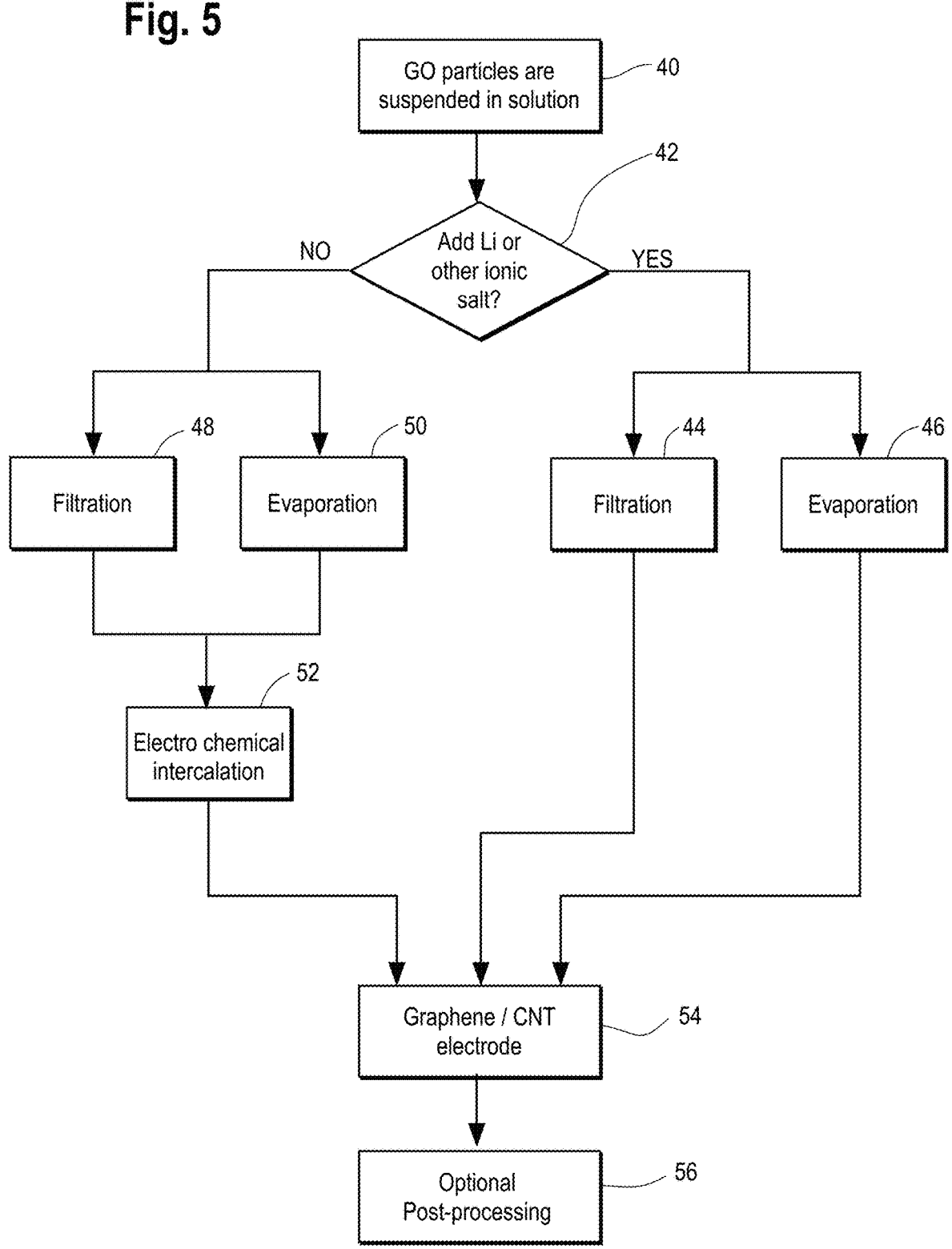

GRAPHENE-CARBON NANOTUBE HYBRID ELECTRODE MATERIAL

CROSS REFERENCE TO RELATED APPLICATIONS

The present application is a divisional application of U.S. patent application Ser. No. 15/593,623, filed May 12, 2017, entitled "GRAPHENE-CARBON NANOTUBE HYBRID ELECTRODE MATERIAL", the entire contents of which are incorporated herein by reference

BACKGROUND

The invention relates generally to a hybrid nanostructured electrode material and its method of preparation for use in advanced rechargeable energy storage and power sources.

Many devices and applications rely on portable, rechargeable energy storage, or batteries. Some of these applications require both a reasonable supply of energy, as well as an occasional need for brief, high energy supply, or a pulse power. Automobiles using batteries often require a pulse of energy during acceleration, for example. Laser-powered flashlights may use both steady state and high energy pulse power for certain situations. Another application is in air and space vehicles, which require short periods of pulse power for thrust.

Current rechargeable electrochemical energy storage and pulse power sources have electrodes that exhibit higher than desired internal resistances and/or limited charge storage (active internal surface area) capacity. These limitations restrict the design of devices from simultaneously having both high power and high specific energy performance properties. As a consequence, situations with large energy demands and/or pulse power loads require oversizing batteries to meet application needs.

Advanced batteries taking advantage of new lithium chemistries have been investigated in the prior art, for example, lithium-nickel silicide nanowire anode technology (theo. capacity: 2,468 mAh/g vs a graphite anode capacity of 372 mAh/g). Key to achieving this performance level is the incorporation of a high specific surface area, low resistance graphene film with the silicide nanowire electrode. Another alternative is the silicon anode (theo. capacity 4,442 mAh/g) however, it's cycling performance is very limited.

Carbon nanotubes (CNTs) have provided enhanced performance in many technologies, however, while advanced CNT-based electrodes have lower resistance for pulse power uses, they also have limited Li (lithium) intercalation/adsorption capacity thus limiting their energy storage capacity. Graphene is another nanomaterial used for energy storage, however while graphene-based electrodes have a higher energy storage capacity, they also have lower electrical conductivity.

Thus, a need exists for improved electrode material for enhanced conductivity for advanced power sources having both high specific power (W/kg) and high specific energy (Whr/kg) performance.

SUMMARY

The invention in one implementation encompasses a hybrid nanostructured electrode material and its method of preparation for use in advanced rechargeable energy storage and power sources. Thin hybrid anodes consisting of doped, low electrical resistivity, well-interconnected CNT sheet material with deposited high defect structure graphene nanoparticles provide a battery with both high specific energy and pulse power capabilities.

In an embodiment, the invention encompasses a hybrid electrode having a non-woven sheet of carbon-nanotubes (CNTs) and a layer of lithiated graphene nanoparticles deposited on said sheet of CNTs.

In a further embodiment, the CNTs are single-walled with a diameter of approximately 1 to 20 nanometers and an aspect ratio ranging from approximately 50 to 5000. In addition, the CNTs may be multi-walled with a diameter of approximately 2-80 nanometers and an aspect ratio ranging from approximately 50 to 5000.

Further, the graphene nanoparticles may be high defect single sheet graphene with adsorbed lithium (Li) ions having a formula $Li_{1+n}C_6$ where n=1 to 5.

In another embodiment, the invention encompasses an energy storage device, having a plurality of hybrid electrodes according to any of the above embodiments, and an electrolyte solution.

In a further embodiment, the electrolyte solution is selected from a group including lithium perchlorate (LiClO$_4$), lithium tetrafluoroborate (LiBF$_4$), lithium hexafluorophosphate (LiPF$_6$), lithium tris(perfluoroethyl)trifluorophosphate (LiFAP), lithium bis(Oxalato)borate (LiBOB), lithium bis(perfluoroethylsulfonyl)imide (LiBETI), lithium fluoroalkylborate (LiFAB), or lithium Trifluoromethanesulfonate (Li(CF$_3$SO$_3$))

Further, the energy storage device may include a plurality of additional energy storage devices connected in either a series or parallel fashion.

In another embodiment, the invention encompasses a method of manufacturing a hybrid electrode including the steps of suspending graphene oxide (GOx) particles in a first solution; and combining the solution with a non-woven sheet of carbon nanotubes (CNTs) to create a film of graphene on the sheet of CNTs.

In a further embodiment, the suspending step includes a step of adding an ionic salt to the first solution to form a second solution. In addition, the ionic salt is lithium ion based salt. Further, the combining step includes the steps of forming the non-woven sheet of CNTs into a porous filter or support structure; and using vacuum, pressurant gas or centrifugal force to draw or infiltrate the second solution onto or into the porous substrate. Alternatively, the combining step includes the steps of placing the sheet of CNTs in an evaporative container or vessel; adding the second solution to the evaporative vessel; and evaporating the second solution to leave a thin film of graphene particles intercalated with the ionic salt.

In an alternative embodiment, the combining step includes the steps of forming the non-woven sheet of CNTs into a porous filter or support structure; and using vacuum, pressurant gas or centrifugal force to draw or infiltrate the first solution onto or into the porous substrate. Alternatively, the combining step includes the steps of placing the sheet of CNTs in an evaporative container or vessel; adding the second solution to the evaporative vessel; and evaporating the first solution to leave a thin film of graphene particles intercalated with the ionic salt. Either of these methods may include a step of electrochemical intercalation after the combining step.

In any of the above methods, the evaporating step may be performed at a temperature of approximately 60 to 65° C. up to 80° C.

In any of the above methods, the GOx particles may be de-oxygenated or reduced into a graphene film.

In any of the above methods, the method does not require any additional surfactants or reducing agents.

In any of the above methods, the suspending step includes a step of suspending at least one of carbon nanotubes, metal nanowires, shaped metal microparticles and shaped metal nanoparticles in the first solution.

In any of the above methods, the suspending step includes a step of suspending inorganic particles in the first solution to control the porosity of the deposited film.

BRIEF DESCRIPTION OF THE DRAWINGS

Features of example implementations of the invention will become apparent from the description, the claims, and the accompanying drawings in which:

FIG. 5 is a flowchart illustrating a method according to the present invention.

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

The invention encompasses a hybrid nanostructured electrode material and its method of preparation for use in advanced rechargeable energy storage and power sources. The hybrid nanostructured material includes non-woven carbon nanotube (CNT) sheet material on which graphene has been grown or deposited by any number of different techniques, including vapor deposition and wet chemical methods.

Figure 1:
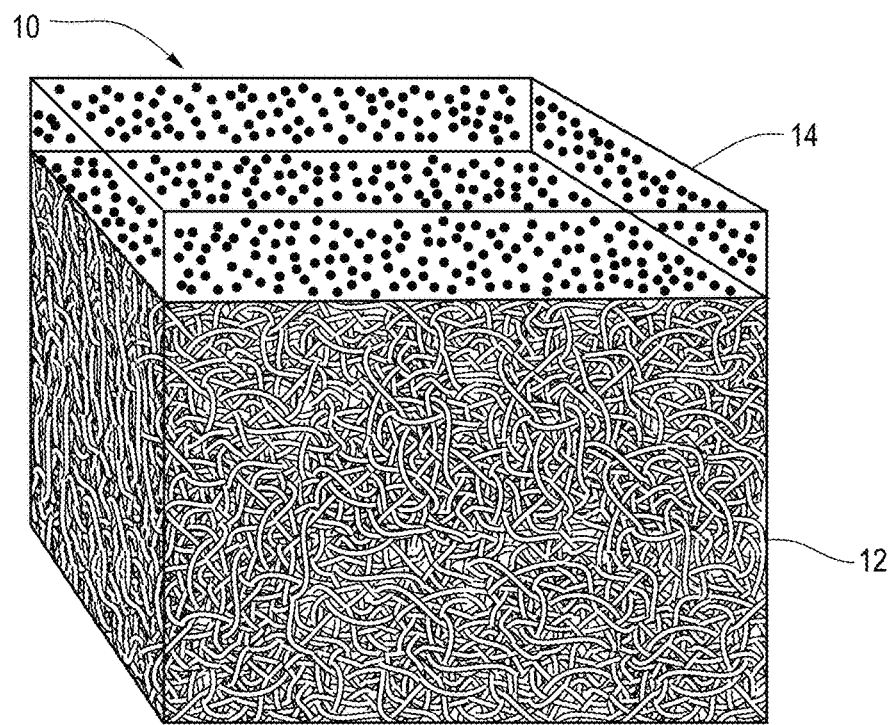
FIG. 1 is a representation of a hybrid nanostructured electrode according to the present invention.

An embodiment of the inventive hybrid nanostructured electrode 10 is shown in FIG. 1. Electrode 10 includes a non-woven CNT sheet 12 that forms a mechanically robust electrically conductive support material. In an embodiment, the non-woven CNT sheet is made of single walled or multi-walled high aspect ratio (length-to-diameter ration) carbon nanotubes having a diameter of approximately 1-20 nm for single-walled CNTs, approximately 3-80 nm for multi-walled CNTs and lengths of approximately 100 to 10,000 nm. The non-woven sheets are made in a variety of ways, including wet and dry processes.

Referring to FIG. 1, a thin film 14 consisting of single or few layer graphene oxide particles that forms a high power capacity graphene film is deposited on CNT sheet 12. The resulting hybrid electrode functions as a pulse power source and current collector that can be integrated with newly emerging high energy density nanowire and other battery anode materials.

Figure 2A:
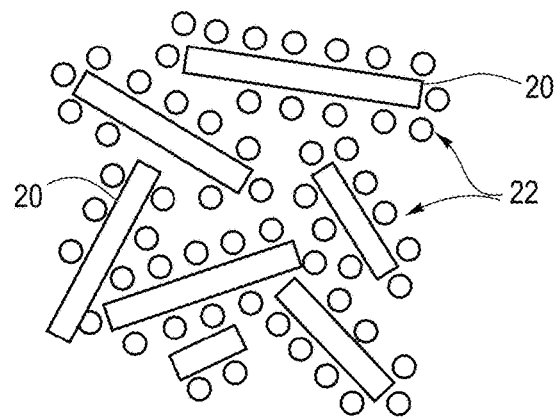
FIGS. 2A and 2B are representations of graphene particles with intercalated lithium ions.
Figure 2B:
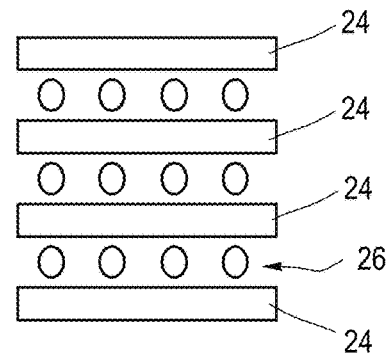

The turbostratic structure of lithiated graphene film versus regular intercalated graphite is shown in FIGS. 2A and 2B respectively. A representation of graphene particles for use in the present invention is shown in FIG. 2A. Lithiated single-layer graphene include graphene particles 20, with adsorbed lithium (Li) ions 22. The resulting particles have the formula $Li_{1+n}C_6$. The high defect single sheet graphene is capable of storing an electrical charge that is much greater than 372 Ah/kg. By contrast, FIG. 2B depicts a 4-sheet particle of low defect lithium-intercalated graphite. Graphene sheets 24 are separated by intercalated Li ions. As is apparent from the figures, the 4-sheet graphite particle of FIG. 2B has a much smaller capacity for Li ions Therefore energy storage capacity is no more than 372 Ah/kg and thus much lower than that of the high defect single sheet graphene film of FIG. 2A.

Figure 3:
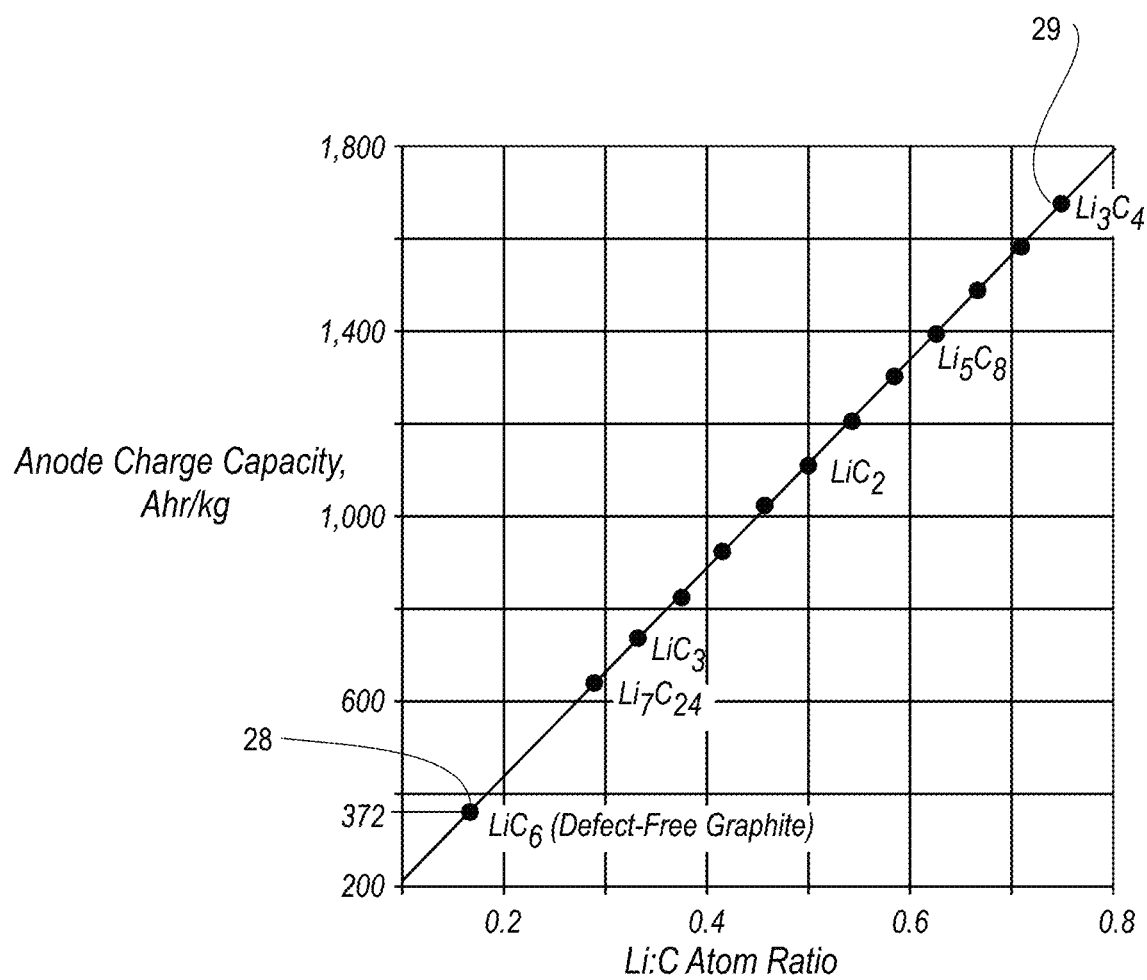
FIG. 3 is a graph showing the electrode capacity of reduced GO (rGO) films as a function of their Li:C stoichiometry.

FIG. 3 is a graph showing the electrode capacity of reduced GO (rGO) films as a function of their Li:C stoichiometry. In particular, Li:C atom ratios are plotted vs. Anode Charge Capacity, Ah/kg. As shown at the point marked 28, defect free graphite as represented in FIG. 2B has a formula of $LiC_6$ giving it an atom ratio of approximately 0.167 with a storage capacity of 372 Ah/kg. Increasing the Li:C atom ratio leads to much higher charge capacity, as shown for example, at point 29 which indicates that $Li_3C_4$ has an atom ration of 0.75 and a charge capacity of almost 1700 Ah/kg.

In a further embodiment, the invention encompasses methods for depositing in-situ reduced single layer graphene nanoparticles of FIG. 2A on CNT sheet materials without the use of external reducing agents. In both methods, the graphene oxide particles are suspended in solution, for example, water or a water/alcohol solution. In a first embodiment, the CNT sheet material is used as a filter and the graphene oxide particle suspension is drawn through the CNT via suction or alternatively by a pressurized feed system. In the second embodiment, the CNT sheet material is placed in a container, for example, an aluminum or glass evaporation container, the graphene oxide particle suspension is added and the in-situ reduced graphene film is formed by evaporation. The time period needed to accomplish filtration or evaporation can vary from tens of minutes to several hours depending on the pore size and areal coverage of the CNT sheet material, and in the case of evaporation on the air convection and temperature at which the evaporation step is conducted. Mild evaporation temperature conditions ranging from an ambient temperature of approximately 60 to 65° C. up to 80° C. are sufficient to effect graphene oxide particle reduction in the presence of CNT sheet material and the loss of water or water-alcohol media. These mild filtering and evaporation temperature conditions are much below the 130 to 250° C. generally requried for thermal deoxygenation and conversion of graphene oxide to graphene.

Both methods are in-situ deposition/reduction processes for producing the reduced graphene oxide/graphene nanoparticle films on CNT sheet material. No additional surfactants or reducing agents are employed for dispersing and reducing the graphene oxide platelet particles from acidified aqueous suspensions.

For either of the above methods, lithiation and other ion intercalation of films may be accomplished either during the filtration/evaporation process or in a subsequent post treatment step. For intercalation during a filtration/evaporation process, Li ion and other ionic salts of interest may be added to the GO suspension and co-deposited along with the GO/rGO.

Alternatively, the films may be lithiated after the filtration/evaporation process by electrochemical intercalation. In this process, the dried film is suspended on an electrically non-conducting porous separator material, placed in contact with a lithium metal cathode and immersed in a compatible organic solvent to form an electrochemical cell. Electrical contact is made is made, a voltage/current source is attached and then anodically and cathodically cycled to effect lithium electrode oxidation/reduction and the Li ion intercalation/charging of the GO/rGO anode. In an embodiment, lithium is used for intercalation because it is the lightest weight option but other ionic salts could be used if weight is not a factor in the finished device.

As noted above, graphene oxide is reduced to graphene in-situ during the filtering/deposition process. In the case of CNT sheet material, the graphene film resulting from the first method is shown at 30 in FIG. 4A. The reduction could possibly involve oxidation of CNT defect sites and/or the oxidation of the transition metal CNT growth catalyst. In the evaporation case the same reduction processes are likely operable resulting in reduced graphene oxide or graphene film shown at 32 in FIG. 4A.

Figure 4A:
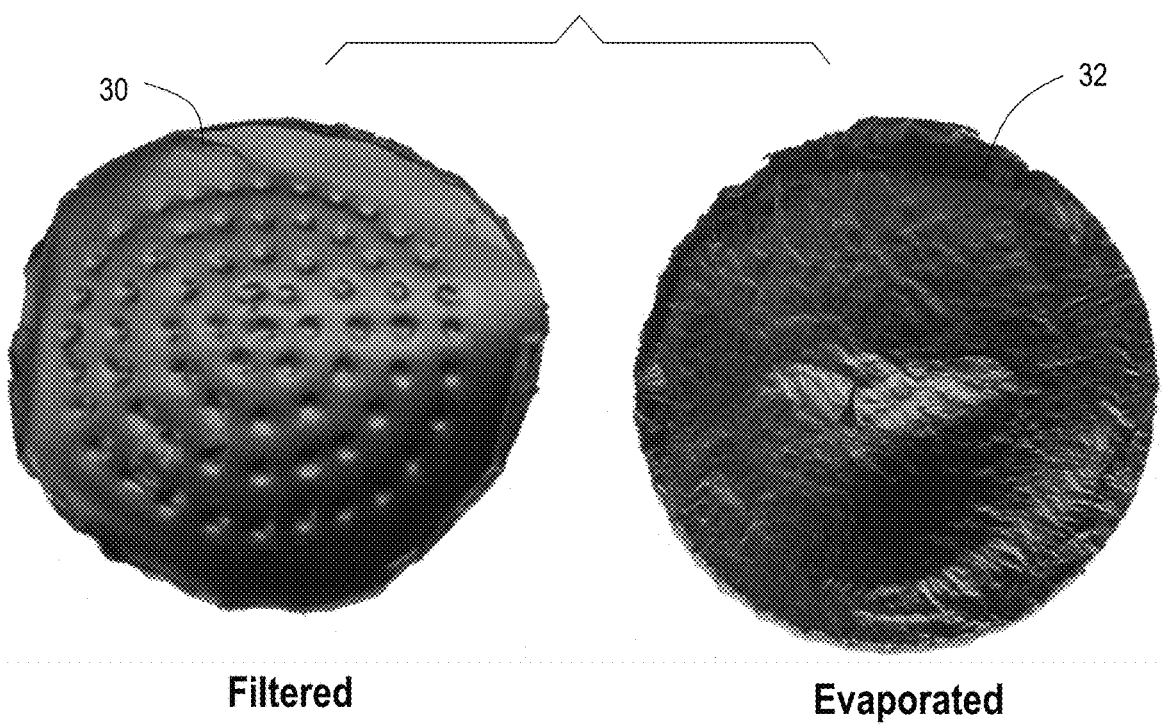
FIGS. 4A and 4B show various graphene oxide films according to the present invention.
Figure 4B:
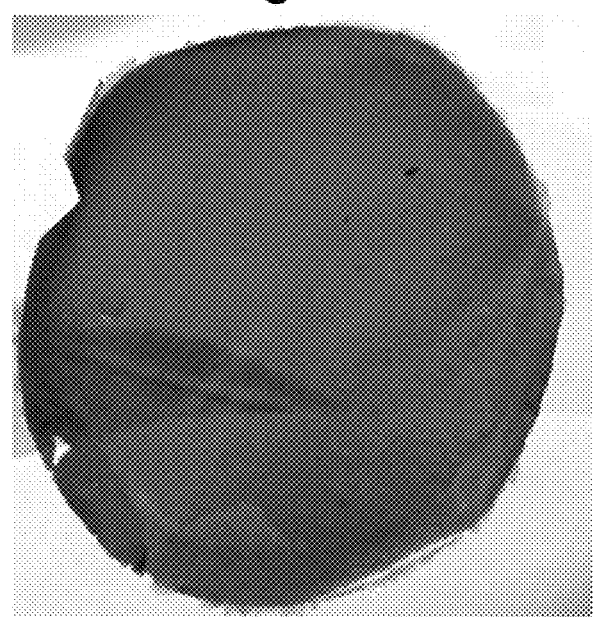

Regardless of the reduction mechanism, the conversion of non-conducting graphene oxide in to the reduced conducting graphene form is effected without additional chemical reducing agents or elevated temperature deoxygenation treatment. The characteristic dark black/brown color of the in-situ reduced conducting graphene films 30 and 32 are shown is shown in FIG. 4A. In stark contrast, the commercial transparent amber-colored, non-conducting graphene oxide (GOx) is shown in FIG. 4B. This commercial GOx film product is produced via a filtration process that does not involve CNT sheet material.

The various methods of forming a hybrid electrode material according to the present invention are illustrated in the flowchart of FIG. 5. At step 40, graphene oxide particles are suspended in solution. At step 42, a decision is made as to whether to lithiate the hybrid electrode material before or after a film is formed. If the answer at step 42 is yes, then Li or other ionic salts are added to the solution, and the method proceeds with filtration 44 or evaporation 46 as described above. If the answer at step 42 is no, the method proceeds with filtration 48 or evaporation 50, followed by electrochemical intercalation at step 52. All three of methods 44, 46 and 52 culminate in the production of a graphene/CNT hybrid electrode at 54.

To further tailor operating characteristics of a hybrid electrode material, optional post-processing as depicted at 56 in FIG. 5 can be used. Graphene oxide and reduced graphene oxide (GO/rGO) films prepared by means of the present invention may be partially or further deoxygenated (chemically reduced) to achieve specifically targeted electrode stoichiometries/capacities as well as lithium ion or other ionic species concentrations using a variety of auxiliary post production methods. For example, the films may be post-treated at elevated temperatures in vacuum or in the presence of inert gases such as nitrogen, argon, helium, etc, to adjust their oxygen content and defect state. In a similar way, the oxygen content and defect state can be adjusted with gaseous or vaporous chemical reducing agents such as carbon monoxide, ammonia, and hydrazine and other materials.

Alternatively, films prepared according to the present invention may be treated with solution-based agents, including hydrazine, ferrous iodide, stannous fluoride as well as other known reducing chemical agents. Oxygen content and defect state of prepared films may also be adjusted using wet electrochemical methods as well dry film electron and various ion beam irradiation techniques.

Figure 6:
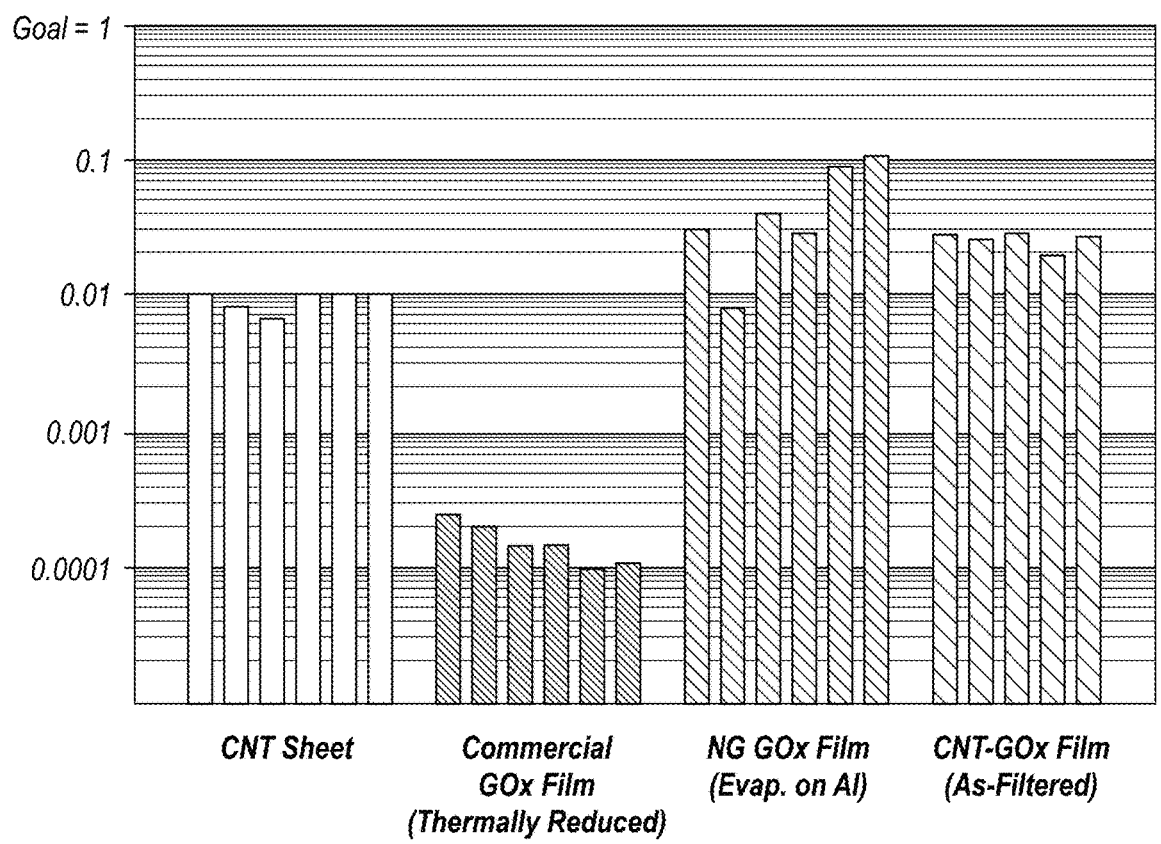
FIG. 6 is a graph of conductivity properties of CNT sheets and various GOx films, alone and combined.

The superior conductivity properties of the in-situ reduced graphene films and hybrid CNT-Graphene electrode material are shown in FIG. 6.

The new process is an environmentally attractive and easily scalable filtration or evaporation process involving the deposition of single or few layer graphene particles from aqueous or mixed solvent suspensions of graphene oxide on CNT sheet material. The hybrid electrode material produced via this process has superior electrical conductivity properties and offers higher adsorption/intercalation surface area than simple CNT sheet materials. Importantly, the new CNT-Graphene hybrid material also has sufficient mechanical strength which permits it to be rolled in to tubular shapes for use in cylindrical form factor batteries or pressed in to thin film/plates for fabricating prismatic, pouch and button cell type batteries.

Regardless of form factor, an energy storage device, or battery, according to the present invention encompasses at least two hybrid electrodes as described above in an electrolyte solution. Electrolyte solutions include, for example, lithium perchlorate ($LiClO_4$), lithium tetrafluoroborate ($LiBF_4$), lithium hexafluorophosphate ($LiPF_6$), lithium tris(perfluoroethyl)trifluorophosphate (LiFAP), lithium bis(Oxalato)borate (LiBOB), lithium bis(perfluoroethylsulfonyl)imide (LiBETI), lithium fluoroalkylborate (LiFAB), and lithium Trifluoromethanesulfonate ($Li(CF_3SO_3)$). The choice of electrolyte solution is impacted by design considerations such as the resulting output voltage of an individual cell and the preferred output voltage of a plurality of cells electrically connected in either in a series or parallel fashion.

Numerous alternative or modified implementations of the present invention exist. For example, binary, ternary and higher constituent particle suspensions could be used to deposit mixed composition conductive films and therefore fine tune the operation of the electrode to meet performance objectives. Such mixed composition suspensions could consist of graphene with carbon nanotubes, graphene with metal nanowires, graphene with other shaped metal micro- and nano-particles to produce mixed composition conductive films. Metallic particles will increase the electrode's electrical conductivity thus maximizing pulse power but they also reduce storage capacity. CNT additives increase specific energy density and pulse power capability.

Various processing additives that aid filtration or control porosity of the deposited film can also be used. These types of inorganic particles can be left in place or removed prior to electrode assembly. Particles that are left in place can contribute to the film's resistance or ability to charge and discharge but also add weight. Other particles, such cellulose fibers, styrene beads or microbeads, can be dissolved, heated or oxidized to remove them after film formation process. A more porous film provides a low resistance diffusion path that is better for ionic mobility but at the same time, it reduces the electrical conductivity of the electrode. In other words, there is less mass to store charge but it is easier to get the charge into and out of the electrode.

The steps or operations described herein are just for example. There may be many variations to these steps or operations without departing from the spirit of the invention. For instance, steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A hybrid electrode, comprising:
   a well-interconnected, non-woven sheet of carbon-nanotubes (CNTs), the CNTs being selected between single-walled, having a diameter of approximately 1 to 20 nanometers and an aspect ratio ranging from approximately 50 to 5000, or multi-walled, having a diameter of approximately 2-80 nanometers and an aspect ratio ranging from approximately 50 to 5000; and
   a layer of lithiated graphene nanoparticles deposited on said sheet of CNTs, the graphene nanoparticles being high defect single sheet of graphene having adsorbed lithium ions of the formula $Li_{1+n}C_6$, where n=1 to 5 and are processed to comprise reduced conducting graphene.

2. An energy storage device, comprising:
   a plurality of hybrid electrodes, each further comprising:
   a well-interconnected, non-woven sheet of carbon-nanotubes (CNTs)), the CNTs being selected between single-walled, having a diameter of approximately 1 to 20 nanometers and an aspect ratio ranging from approximately 50 to 5000, or multi-walled, having a diameter of approximately 2-80 nanometers and an aspect ratio ranging from approximately 50 to 5000;
   a layer of lithiated graphene nanoparticles deposited on said sheet of CNTs; and
   an electrolyte solution, the graphene nanoparticles being high defect single sheet of graphene having adsorbed lithium ions of the formula $Li_{1+n}C_6$, where n=1 to 5 and are processed to comprise reduced conducting graphene.

3. The energy storage device of claim 2, wherein the electrolyte solution further comprises lithium perchlorate ($LiClO_4$), lithium tetrafluoroborate ($LiBF_4$), lithium hexafluorophosphate ($LiPF_6$), lithium tris(perfluoroethyl) trifluorophosphate (LiFAP), lithium bis(Oxalato)borate (LiBOB), lithium bis(perfluoroethylsulfonyl)imide (LiBETI), lithium fluoroalkylborate (LiFAB), or lithium Trifluoromethanesulfonate ($Li(CF_3SO_3)$).

4. The energy storage device of claim 2, further comprising a plurality of additional energy storage devices connected in either a series or parallel fashion.

5. The energy storage device of claim 2, wherein the layer of lithiated graphene nanoparticles is partially deoxygenated or further deoxygenated.

6. The energy storage device of claim 5, wherein one or more of an oxygen content and a defect state of the layer is adjusted.

7. The energy storage device of claim 6, wherein the adjusting comprises post-treating the layer at an elevated temperature.

8. The energy storage device of claim 6, wherein the elevated temperature comprises a temperature ranging from approximately 130 to approximately 250° C.

9. The energy storage device of claim 8, wherein the adjusting is performed in vacuum.

10. The energy storage device of claim 8, wherein the adjusting is performed in the presence of an inert gas.

11. The energy storage device of claim 10, wherein the inert gas comprises one or more of nitrogen, argon, and helium.

12. The energy storage device of claim 6, wherein the adjusting comprises a chemical reducing agent.

13. The energy storage device of claim 12, wherein the chemical reducing agent comprises one or more of a gaseous chemical reducing agent and a vaporous chemical reducing agent.

14. The energy storage device of claim 12, wherein the chemical reducing agent comprises one or more of carbon monoxide, ammonia, hydrazine, ferrous iodide and stannous fluoride.

15. The energy storage device of claim 6, wherein adjusting comprises one or more of wet electrochemical methods, dry film electron irradiation, and ion beam irradiation.

16. The hybrid electrode of claim 1, wherein the layer of lithiated graphene nanoparticles is partially deoxygenated or further deoxygenated.

17. The hybrid electrode device of claim 16, wherein one or more of an oxygen content and a defect state of the layer is adjusted.

18. The energy storage device of claim 17, wherein the adjusting comprises post-treating the layer at an elevated temperature.

19. The energy storage device of claim 17, wherein the elevated temperature comprises a temperature ranging from approximately 130 to approximately 250° C.

20. The energy storage device of claim 19, wherein the adjusting is performed in vacuum.

* * * * *

UNITED STATES PATENT AND TRADEMARK OFFICE
CERTIFICATE OF CORRECTION

| | | |
|---|---|---|
| PATENT NO. | : 10,923,716 B1 | Page 1 of 1 |
| APPLICATION NO. | : 16/811248 | |
| DATED | : February 16, 2021 | |
| INVENTOR(S) | : John A. Starkovich et al. | |

It is certified that error appears in the above-identified patent and that said Letters Patent is hereby corrected as shown below:

In the Claims

In Claim 2, Column 7, Line 24, please delete "(CNTs))" and substitute --(CNTs)--.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*